United States Patent [19]

Davies

[11] Patent Number: 5,603,016

[45] Date of Patent: Feb. 11, 1997

[54] METHOD FOR SYNCHRONIZING PLAYBACK OF AN AUDIO TRACK TO A VIDEO TRACK

[75] Inventor: Robert L. Davies, Milpitas, Calif.

[73] Assignee: Intel Corporation, Santa Clara, Calif.

[21] Appl. No.: 285,350

[22] Filed: Aug. 3, 1994

[51] Int. Cl.$^6$ .................................................. G06F 1/12
[52] U.S. Cl. ..................................... 395/551; 348/515
[58] Field of Search ........................... 395/154, 500, 395/550, 152, 878, 882, 2.2, 2.76; 364/271, 271.1, 270.3; 348/512, 515, 423, 462, 484, 500, 508

[56] References Cited

U.S. PATENT DOCUMENTS

| 5,333,299 | 7/1994 | Koval et al. | 395/550 |
| 5,351,092 | 9/1994 | Poimboeuf et al. | 348/512 |
| 5,430,485 | 7/1995 | Lankford et al. | 348/423 |
| 5,467,139 | 11/1995 | Lankford | 348/512 |
| 5,487,167 | 1/1996 | Dinallo et al. | 395/650 |

*Primary Examiner*—Thomas M. Heckler
*Assistant Examiner*—Dennis M. Butler
*Attorney, Agent, or Firm*—Blakely, Sokoloff, Taylor & Zafman

[57] ABSTRACT

A method for synchronizing the audio track to the video track in a multimedia presentation. Any difference in the frequencies of the clocks of the audio and video drivers are first determined. If the video driver operates according to a faster frequency than the audio driver, audio samples are clipped from the audio track. If the video driver operates according to a slower frequency than the audio driver, audio samples are added to the audio track.

21 Claims, 6 Drawing Sheets

METHOD FOR SYNCHRONIZING PLAYBACK OF AN AUDIO TRACK TO A VIDEO TRACK

This invention generally relates to the field of synchronizing devices operating according to different clock frequencies. More particularly, this invention discloses methods and apparatus for synchronizing an audio driver operating at first clock frequency to a video driver operating at a second clock frequency, in a multimedia presentation.

ART BACKGROUND

A multimedia application brings together audio, video and graphics information in a single presentation. Often this requires the use of a video driver, an audio driver and a graphics driver, each of which, potentially, operates according to its own individual clock generator. Although the individual clock generators are ostensibly operating at the same frequency, imperfections in the various clock generators can lead to one clock generator running faster or slower than another clock generator.

For example, for the Indeo® integrated multimedia controller, sold by Intel Corporation™, located in Santa Clara, Calif., the video driver operates according to the system clock while the audio driver is potentially driven by its own clock signal. In the Indeo® controller, the user may install any one of a number of commercially available sound cards. These sound cards typically contain clock generators that are of a much lower quality than the system clock used by the video driver. Consequently, the sound cards clock generator can be off by as much as twelve percent from the system clock.

One prior art method for addressing this problem requires synchronizing the video track to the audio track by discarding video information when the audio track leads the video track. When the audio track is behind the video track, the presentation of the next frame of video data is delayed. This method leads to discontinuities in the video images presented to the audience, which the audience perceived as jerkiness in the video track. Another disadvantage of synchronizing the video track to the audio track is that hundreds of thousands of bytes of video data may be discarded to synchronize the video track to the audio track.

The discontinuities and data loss resulting from synchronizing the video track to the audio track are tolerated in large part due to the belief that synchronizing the audio track to the video track will result in undesirable and intolerable harmonics and shifts in pitch. This is because the audio data samples of the audio track are in the time domain, not the frequency domain. It is believed that it would be necessary to transform the data from the time domain into the frequency domain in order to accurately process the audio data. This would result in additional overhead in both time and hardware, which is undesirable.

As will be described, the methods of the present invention synchronize the audio track to the video track while reducing harmonic dissonance and pitch shift. This is done without shifting the time-base audio samples to the frequency domain for processing. The methods of the present invention further result in a reduction in the amount of data that must be discarded in order to synchronize the video and audio tracks.

SUMMARY OF THE INVENTION

In a computer system having a video driver for processing a video track operating at a first clock frequency and an audio driver for processing an audio track operating at a second clock frequency, a method is disclosed for synchronizing the audio track to the video track in the time domain such that harmonic dissonance and pitch shift are reduced. The audio and video driver are first calibrated by determining whether the first clock frequency is equal to, greater than, or less than the second clock frequency. No further processing is required if the first and second clock frequencies are equal.

If the first clock frequency is greater than the second clock frequency, audio samples are clipped from the audio track to better ensure that the audio and video tracks simultaneously complete playback. Clipping audio samples entails comparing the magnitudes of contiguous samples and clipping one of the contiguous samples if the samples are of equal magnitude. This clipping is performed for each pair of contiguous samples until no further reduction is needed or no identical contiguous pairs remain. Additional clipping is performed, if necessary, by repetitively and sequentially comparing pairs of contiguous audio samples to determine a difference in magnitude for each pair. The pair having the lowest difference in magnitude is averaged, and the pair is clipped from the audio track and replaced by the average. Clipping continues until no further reduction is necessary.

If the first clock frequency is less than the second clock frequency, audio samples must be added to the audio track. Padding the audio track entails identifying the sample having the lowest magnitude and copying that sample. The sample is added to the audio track. The padding process is repeated until no further padding is necessary.

BRIEF DESCRIPTION OF THE DRAWINGS

The objects, features, and advantages of the method and apparatus of the present invention will be apparent from the following detailed description of the invention in which.

DETAILED DESCRIPTION

Methods for synchronizing playback of an audio track and a video track by a computer are disclosed. The clock speed of the audio track determines the rate of the synchronized playback of the audio and video tracks. If the clock speed of the audio track in greater than the clock speed of the video track, samples of the audio track are clipped from the audio track to shorten the audio track. The selection of clipped samples is performed intelligently to reduce audible pitch shift and harmonic dissonance.

Figure 1:
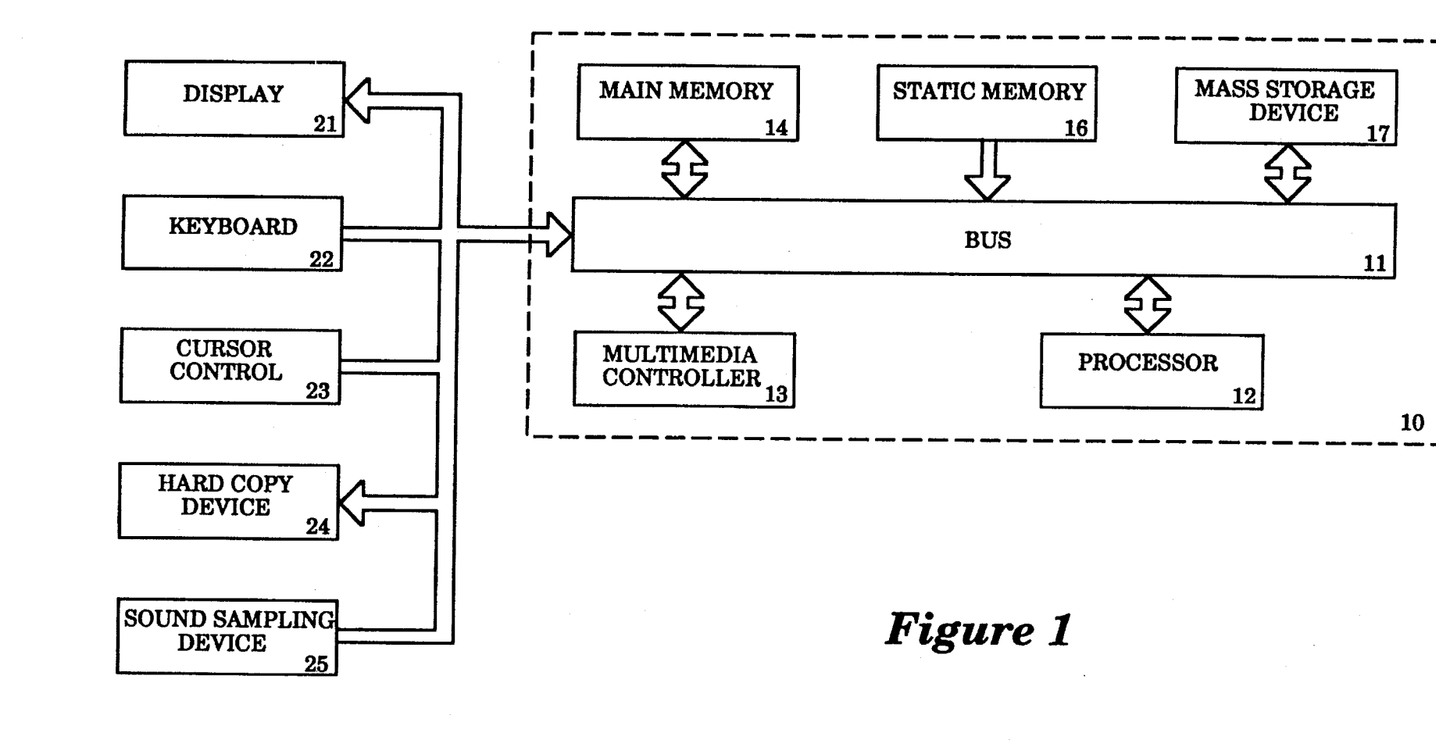
FIG. 1 illustrates a computer system according to one embodiment of the present invention.

Referring to FIG. 1, an overview of a computer system of the present invention is shown in block diagram form. It will be understood that while FIG. 1 is useful for providing an overall description of the computer system of the present invention, a number of details of the system are not shown. As necessary for disclosure of the present invention, further detail is set forth with reference to the other figures provided with this specification. Further, the present invention is described with reference to its preferred embodiment; alternative embodiments which may be conceived by one of ordinary skill in the art are considered within the scope of the claims set forth below.

As illustrated in FIG. 1, a computer system, as may be utilized by the preferred embodiment of the present invention, generally comprises a bus 11 for communicating information, a processor 12 coupled with bus 11 for processing information, a multimedia controller 13 for processing and controlling multimedia applications that combine audio, video and graphics data, a Random Access Memory (RAM) or other dynamic storage device 14 (commonly referred to as a main memory) coupled with bus 11 for storing information and instructions for processor 12, a Read Only Memory (ROM) or other non-volatile storage device 16 coupled with bus 11 for storing non-volatile information and instructions for processor 12, a data storage device 17, such as a magnetic disk and disk drive, coupled with bus 11 for storing information and instructions, a display device 21, such as a cathode ray tube, liquid crystal display, etc., coupled to bus 11 for displaying information to the computer user, an alpha-numeric input device 22 including alpha-numeric and other keys, etc., coupled to bus 11 for communicating information and command selections to processor 12 and a cursor control 23 for controlling cursor movement. The system also includes a hard copy device 24, such as a plotter or printer, for providing a visual representation of the computer images. Hard copy device 24 is coupled with processor 12, main memory 14, non-volatile memory 106 and mass storage device 17 through bus 11. Finally, the system includes a sound recording and playback device 25 for providing audio recording and playback.

Of course, certain implementations and uses of the present invention may not require nor include all of the above components. For example, in certain implementations a keyboard and cursor control device for inputting information to the system may not be required. In other implementations, it may not be required to provide a display device for displaying information.

Figure 2:
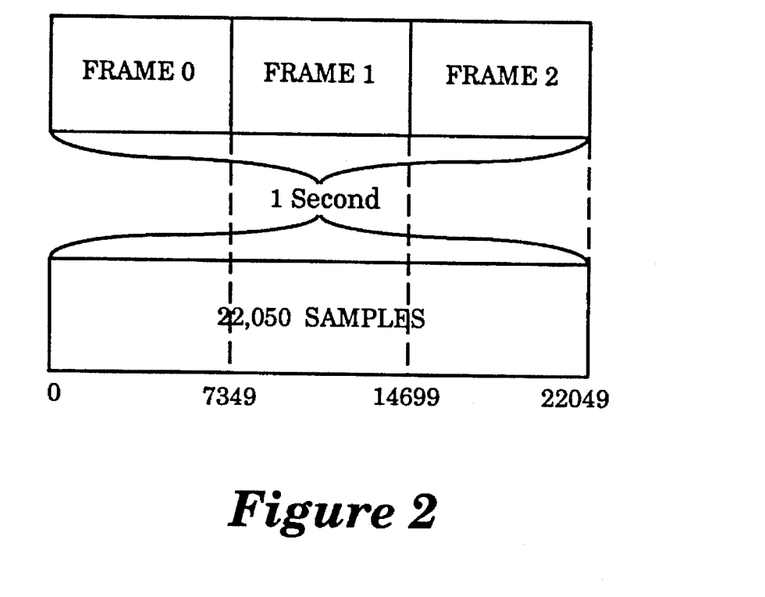
FIG. 2 is a graphical illustration of playback of audio and video tracks operating at the same frequency.

FIG. 2 is a graphical representation of one second of playback of audio and video tracks that are operating according to identical clock frequencies. For this example, the video driver outputs three frames of video data per second, and the audio driver outputs 22,050 samples of audio data per second (22.05 kHz). The audio data and the video data may be stored, for example in the data storage device. One having ordinary skill in the art will recognize that the frame rate and the audio sampling rate are identified for illustrative purposes only.

As can be seen in FIG. 2, the length of the one-second spans are identical, which is not surprising. The audio and video tracks are synchronized, and there is a known and identifiable relationship between progress in the video track and progress in the audio track. This relationship is purely a function of 1) the amount of elapsed time multiplied by the frame rate, for the video data, and 2) the sampling rate, for the audio data. For example, after one-third of a second, one frame of video data and 7,349 samples of audio data have been processed. This behavior is expected when the audio and video tracks are processed using the same clock or two clocks operating at the same frequency.

However, when two individual clock generators are used, there is the possibility that the clock generators do not, in fact, operate at the same frequency. For some applications, the sound driver is part of a sound card that is clocked by its own clock generator, while the video driver is clocked by the system clock. Typically, the system clock is extremely precise, while the clock generator of the sound card may be manufactured of a much lower quality component. This often leads to the clock generator of the sound driver differing from the system clock by as much as 12%.

If the audio and video tracks are meant to finish simultaneously, the difference in frequencies will defeat this goal unless the asynchronicity is addressed. The asynchronicity can best be understood by realizing that when the audio and video drivers operate according to different clock frequencies, the audio driver and the video driver measure the passage of time differently. Prior art methods have assumed that the clock for the audio driver is the correct measure of time. By contrast, the present method assume that it is the clock for the video driver that is correct.

Figure 3:
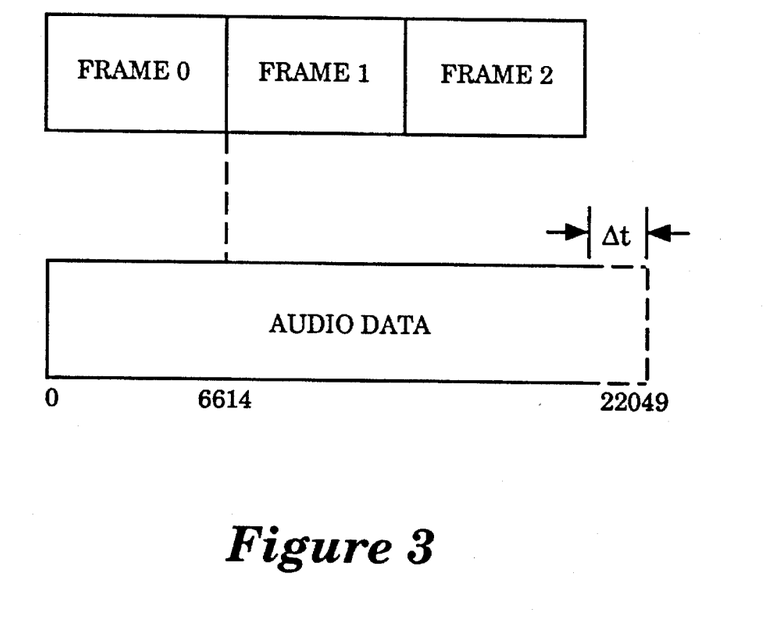
FIG. 3 is a graphical illustration of playback of audio and video tracks where the clock of the video driver is faster than the clock of the audio driver.

FIG. 3 is a graphical representation for one second of playback of the audio and video tracks wherein the clock generator of the audio driver is 10% slower than the clock of the video driver. Assuming that the system clock is the correct measure of time, it may be seen that the audio track that supposedly takes one second to complete playback actually takes longer to complete, as indicated by $\Delta t$.

Figure 4:
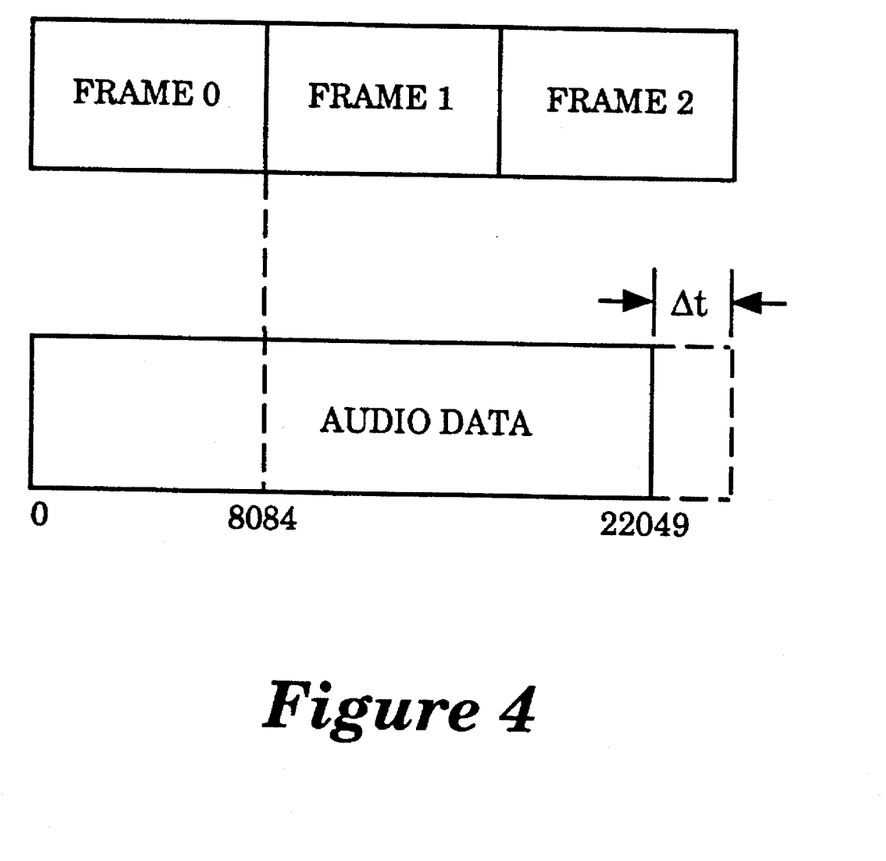
FIG. 4 is a graphical illustration of playback of audio and video tracks where the clock of the video driver is slower than the clock of the audio driver.

FIG. 4 is a graphical representation for one second of playback of the audio and video tracks in which the audio driver is clocked by a clock generator that is 10% faster than the clock of the video driver. As may be seen, the audio track completes playback before a full second of time according to the clock of the video driver has completed, as indicated by $\Delta t$.

Returning to the ideal system of FIG. 2, the expected frame rate of the video track is known. For this example, the expected frame rate is three frames of video data per second. If the clock of the video track is assumed to be accurate, the processor can be instructed to generate an interrupt each time a frame of video data completes playback, or every one-third of a second. For the ideal system, the audio driver will have played back 7,350 samples of audio data in the same time span. The progress of the audio driver can be checked. If the audio driver has played back fewer samples, the audio track should be shortened to better ensure that the audio track and the video track complete playback simultaneously. If the audio driver has played back more samples than the expected 7,350, the audio track should be lengthened. If the samples that are removed or the samples that are added are carefully chosen, the shift in pitch can be reduced.

Figure 5:
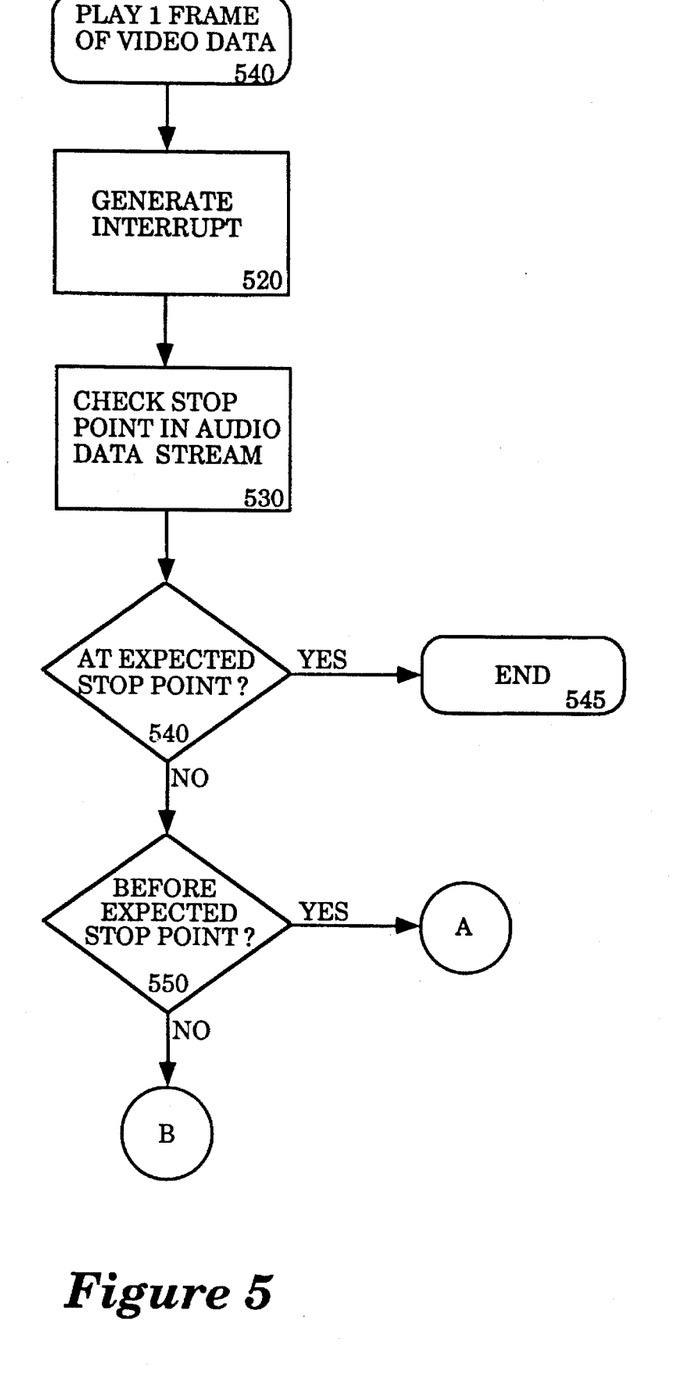
FIG. 5 illustrates the calibration process according to one embodiment of the present invention.

FIG. 5 is a flow diagram illustrating calibration of the two clock generators according to one embodiment of the present invention. For the illustrative embodiment, an interrupt is generated by the processor after one full frame of video data is played back. In step 510, one full frame of the video data is played back while audio data is played back, as well. At step 520, the interrupt is generated. At step 530, the processor checks the stop point in the audio track. At step 540, the processor compares the value of the stop point to the value of the expected stop point. The expected stop point is equal to the sample rate of the audio track divided by the frame rate of the video track. For the illustrative embodiment, the expected stop point is 7,350 audio samples per frame of video data.

If the stop point is at the expected value at step 540, then the process of calibration ends at step 545. The video track and the audio track are already synchronized. If the stop point is not the expected stop point, the processor determines whether the stop point is before the expected stop point in step 550. If the stop point is before the expected value, the processor goes to point A. If the stop point is after the expected value, the processor proceeds to point B. The calibration process need only be performed once for each audio driver in the computer system if more than one audio driver is coupled to the system, calibration values may be calculated and stored for each audio driver. The stored calibration value may be accessed as required.

Figure 6:
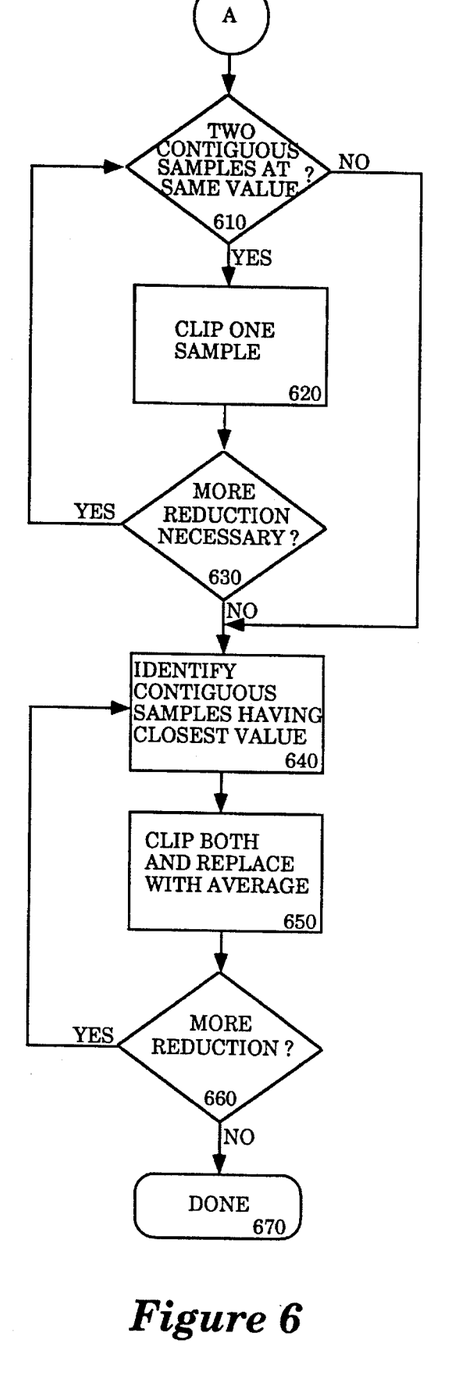
FIG. 6 illustrates the clipping process according to one embodiment of the present invention.

FIG. 6 illustrates the manner in which the illustrative embodiment of the present invention handles the situation where the audio data clock is slower than the video data clock, which is the situation illustrated in FIG. 3. To better ensure that the audio track conveys its information within one second according to the video data clock, samples must be clipped from the audio track in order to reduce $\Delta t$ to zero. This requires that for each frame of video data, the audio driver plays back a number of samples equal to the number of samples at the stop point. For this example, 6,615 audio samples must be played for each frame of video data. All processing is performed in the time domain.

Returning to FIG. 6, at step 610 the processor scans the audio track to identify two contiguous samples having the same value. If two contiguous samples having the same value are found, one of the samples is clipped from the stream at step 620, thus reducing the length of the audio track by one sample. If more reduction is necessary, as determined at step 630, the processor continues to sample pairs of contiguous samples to determine whether or not the contiguous samples have the same value. If no two contiguous samples in the audio track are determined to have the same value at step 610, the reduction of the audio track continues. At step 640, the processor identifies the contiguous samples in the audio track having the closest values. When the contiguous samples having the closest values are identified, an average of those samples are taken and the processor replaces the two samples with the average value of the two samples at step 650, thus reducing the length of the audio track by one sample. If further reduction is deemed necessary by the processor at step 660, the processing continues at step 640 until no further reduction is required. The reduction process completes at step 670.

The processor uses the absolute value of the time domain samples as defined by the value of the samples in binary. For example, if the sample size is 16 bits, the value of the two bytes are compared to the value of the two bytes of the nearest data sample. Typically, in audio applications, a smaller value of the sample indicates a lower volume. Thus, 16 bits having all zeros would indicate silence. The step 610 of the flow diagram in FIG. 6 can be modified to ensure that only contiguous samples having a value below a certain threshold value are removed from the audio track.

Figure 7:
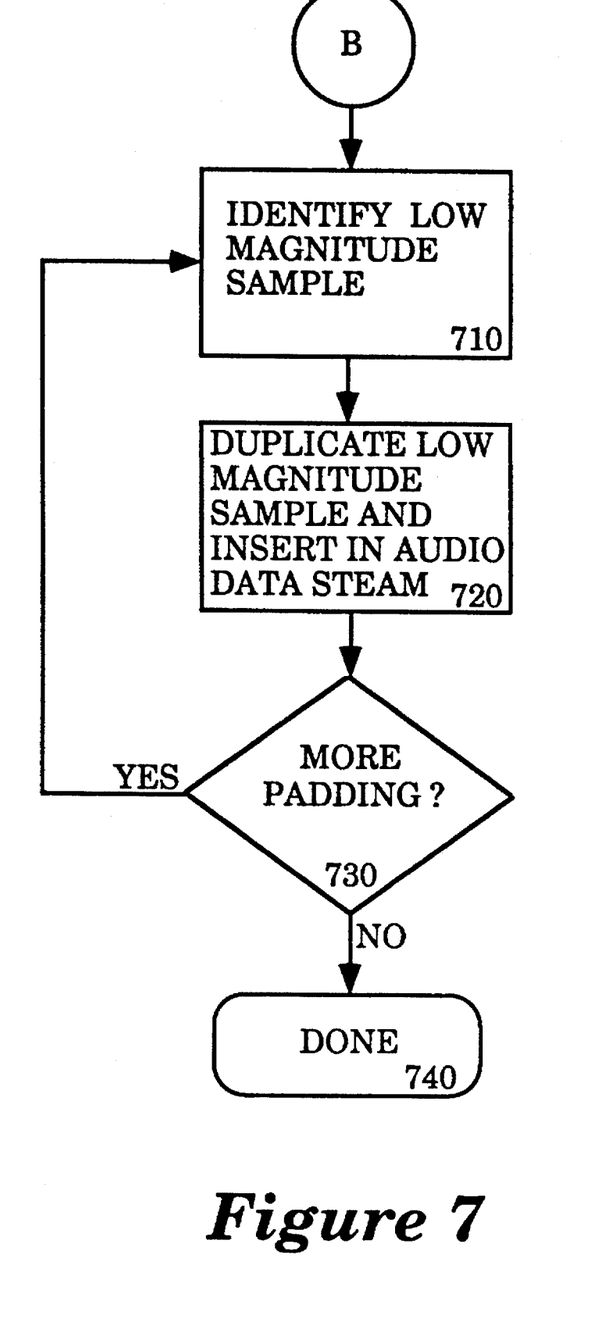
FIG. 7 illustrates the padding process according to one embodiment of the present invention.

FIG. 7 is a flow diagram according to the illustrative embodiment of the present invention where the audio driver clock is faster than the video driver clock. This situation is illustrated in FIG. 4, where the audio track completes before all three frames of video data have been displayed. In order to address this problem, the processor must pad the audio track such that $\Delta t$ is reduced to zero. In the example of FIG. 4, 735 samples must be added to the audio track for each frame of video data. Again, all processing is performed in the time domain.

Returning to FIG. 7, the processor scans the audio track and identifies the audio samples having the lowest magnitude in the audio track at step 710. At step 720, the low magnitude sample is duplicated and the duplicate is inserted in the audio track, increasing the length of the audio track by one sample. If more padding is required at step 730, the process is continued at step 720 until no further padding is required. The processor then finishes the task at step 740.

Thus, a method for synchronizing the audio track to the video track has been described. This method reduces pitch shift and harmonic dissonance. Although the present invention has been described in terms of the preferred embodiments, it will be appreciated that various modifications and alterations might be made by those skilled in the art without departing from the spirit and scope of the inventions described in the claims that follow.

What is claimed is:

1. In a computer system having a video driver for processing a video track operating at a first clock frequency and an audio driver for processing an audio track operating at a second clock frequency, a method for synchronizing the audio track to the video track such that harmonic dissonance and pitch shift are reduced, the method comprising the steps of:

determining whether the first clock frequency is equal to, greater than, or less than the second clock frequency;

removing at least one audio sample from the audio track, if the first clock frequency is greater than the second clock frequency by comparing two contiguous audio samples and clipping one sample if the contiguous audio samples are identical; and adding at least one audio sample to the audio track, if the first clock frequency is less than the second clock frequency.

2. The method of claim 1, wherein the step of removing at least one audio sample further includes the steps of:

repetitively and sequentially comparing pairs of contiguous audio samples such that a difference in magnitude is identified for each pair of contiguous samples in the audio track;

identifying a first pair having a lowest difference in magnitude;

averaging the first pair to produce an average value audio sample;

clipping the first pair from the audio track; and placing the average value audio sample in the audio track.

3. The method of claim 2, wherein the steps of comparing contiguous audio samples and clipping one sample if the contiguous audio samples are identical is repeated for each pair of contiguous audio samples in the audio track, until no further removal of audio samples is required or until no pairs of contiguous audio samples remain unscanned.

4. The method of claim 3, wherein the steps recited in claim 3 are undertaken only if the steps recited in claim 2 do not sufficiently reduce the audio track.

5. The method of claim 4, wherein the steps of identifying, averaging, clipping the first pair, and placing are repeated until the audio track is sufficiently reduced.

6. In a computer system having a video driver for processing a video track operating at a first clock frequency and an audio driver for processing an audio track operating at a second clock frequency, a method for synchronizing the audio track to the video track such that harmonic dissonance and pitch shift are reduced, the method comprising the steps of:

determining whether the first clock frequency is equal to, greater than, or less than the second clock frequency;

removing at least one audio sample from the audio track, if the first clock frequency is greater than the second clock frequency; and adding at least one audio sample to the audio track, if the first clock frequency is less than the second clock frequency by determining a magnitude for each audio sample, identifying a first sample having a lowest magnitude, copying the first sample to produce a copied sample, and adding the copied sample to the audio track such that the copied sample is contiguous with the first simple.

7. The method of claim 6, wherein the steps of identifying, copying, and adding are repeated until the audio track is sufficiently increased.

8. In a computer system having a video driver for processing a video track operating at a first clock frequency and an audio driver for processing an audio track operating at a second clock frequency, a method for synchronizing the audio track to the video track such that harmonic dissonance and pitch shift are reduced, the method comprising the steps of:

processing the audio and video tracks until a predetermined video stop point in the video track;

determining an audio stop point in the audio track;

comparing the audio stop point to an expected stop point;

removing at least one audio sample from the audio track, if the audio stop point is beyond the expected stop point, by comparing two contiguous audio samples and clipping one sample if the contiguous audio samples are identical; and adding at least one audio sample to the audio track, if the audio stop point is prior to the expected stop point.

9. The method of claim 8, wherein the step of removing at least one audio sample further includes the steps of:

repetitively and sequentially comparing pairs of contiguous audio samples such that a difference in magnitude is identified for each pair of contiguous samples in the audio track;

identifying a first pair having a lowest difference in magnitude;

averaging the first pair to produce an average value audio sample;

clipping the first pair from the audio track; and placing the average value audio sample in the audio track.

10. The method of claim 9, wherein the steps of comparing contiguous audio samples and clipping one sample if the contiguous audio samples are identical is repeated for each pair of contiguous audio samples in the audio track, until no further removal of audio samples is required or until no pairs of contiguous audio samples remain unscanned.

11. The method of claim 10, wherein the steps recited in claim 9 are undertaken only if the steps recited in claim 8 do not sufficiently reduce the audio track.

12. The method of claim 11, wherein the steps of identifying, averaging, clipping the first pair, and placing are repeated until the audio track is sufficiently reduced.

13. The method of claim 8, wherein the step of adding at least one audio sample further includes the steps of:

determining a magnitude for each audio sample;

identifying a first sample having a lowest magnitude;

copying the first sample to produce a copied sample; and adding the copied sample to the audio track such that the copied sample is contiguous with the first simple.

14. The method of claim 13, wherein the steps of identifying, copying, and adding are repeated until the audio track is sufficiently increased.

15. In a computer system having a video driver for processing a video track operating at a first clock frequency and an audio driver for processing an audio track operating at a second clock frequency, a method for synchronizing the audio track to the video track such that harmonic dissonance and pitch shift are reduced when the first clock frequency is determined to be slower than the second clock frequency, the method comprising the steps of:

comparing two contiguous audio samples; and clipping one sample if the contiguous audio samples are identical.

16. The method of claim 15, the method further comprising the steps of:

repetitively and sequentially comparing pairs of contiguous audio samples such that a difference in magnitude is identified for each pair of contiguous samples in the audio track;

identifying a first pair having a lowest difference in magnitude;

averaging the first pair to produce an average value audio sample;

clipping the first pair from the audio track; and placing the average value audio sample in the audio track.

17. The method of claim 16, wherein the steps of comparing contiguous audio samples and clipping one sample if the contiguous audio samples are identical are repeated for each pair of contiguous audio samples in the audio track, until no further removal of audio samples is required or until no pairs of contiguous audio samples remain unscanned.

18. The method of claim 17, wherein the steps recited in claim 18 are undertaken only if the steps recited in claim 17 do not sufficiently reduce the audio track.

19. The method of claim 18, wherein the steps of identifying, averaging, clipping the first pair, and placing are repeated until the audio track is sufficiently reduced.

20. In a computer system having a video driver for processing a video track operating at a first clock frequency and an audio driver for processing an audio track operating at a second clock frequency, a method for synchronizing the audio track to the video track such that harmonic dissonance and pitch shift are minimized when the first clock frequency is determined to be faster than the second clock frequency, the method comprising the steps of:

determining a magnitude for each audio sample;

identifying a first sample having a lowest magnitude;

copying the first sample to produce a copied sample; and adding the copied sample to the audio track such that the copied sample is contiguous with the first simple.

21. The method of claim 20, wherein the steps of identifying, copying, and adding are repeated until the audio track is sufficiently increased.

* * * * *